United States Patent
Ganshaw et al.

(10) Patent No.: US 9,998,065 B2
(45) Date of Patent: Jun. 12, 2018

(54) TRIM ASSEMBLY

(71) Applicant: Unirac, Inc., Albuquerque, NM (US)

(72) Inventors: Todd Ganshaw, Albuquerque, NM (US); Ernest Gallegos, Albuquerque, NM (US); Jason Mayfield, Albuquerque, NM (US); Nathan Schuit, Edgewood, NM (US)

(73) Assignee: Unirac Inc., Albuquerque, NM (US)

( * ) Notice: Subject to any disclaimer, the term of this patent is extended or adjusted under 35 U.S.C. 154(b) by 0 days. days.

(21) Appl. No.: 15/405,801

(22) Filed: Jan. 13, 2017

(65) Prior Publication Data

US 2017/0133975 A1    May 11, 2017

Related U.S. Application Data

(62) Division of application No. 14/515,990, filed on Oct. 16, 2014, now Pat. No. 9,584,062.

(51) Int. Cl.
| | |
|---|---|
| *H02S 20/23* | (2014.01) |
| *H02S 30/10* | (2014.01) |
| *F16M 13/02* | (2006.01) |
| *F24J 2/04* | (2006.01) |
| *F24J 2/52* | (2006.01) |
| *F24J 2/46* | (2006.01) |

(52) U.S. Cl.
CPC ............ *H02S 20/23* (2014.12); *F16M 13/02* (2013.01); *F24J 2/045* (2013.01); *F24J 2/5207* (2013.01); *F24J 2/5245* (2013.01); *F24J 2/5256* (2013.01); *H02S 30/10* (2014.12); *F24J 2002/4663* (2013.01); *F24J 2002/4665* (2013.01); *F24J 2002/4667* (2013.01)

(58) Field of Classification Search
CPC ......... H02S 20/23; H02S 30/10; F24J 2/5256; F24J 2/5207; F24J 2/045; F24J 2/5245; F24J 2002/4667; F24J 2002/4665; F24J 2002/4663; F16M 13/02
See application file for complete search history.

(56) References Cited

U.S. PATENT DOCUMENTS

| | | | |
|---|---|---|---|
| 5,546,713 A | * | 8/1996 | Voegele, Jr. ............... E04D 3/08 52/202 |
| 7,260,918 B2 | | 8/2007 | Liebendorfer |
| 7,434,362 B2 | | 10/2008 | Liebendorfer |
| 7,592,537 B1 | | 9/2009 | West |
| 7,956,281 B2 | | 6/2011 | O'Brien et al. |
| 8,109,048 B2 | | 2/2012 | West et al. |

(Continued)

FOREIGN PATENT DOCUMENTS

| | | |
|---|---|---|
| EP | 2 626 651 A1 | 8/2013 |
| EP | 2 664 727 A1 | 11/2013 |

(Continued)

OTHER PUBLICATIONS

"Quick Rack QMQR—EF—Enphase Mount Assembly"—Quick Mount PV, Walnut Creek, CA, (Four (4) pages), Sep. 2014.

(Continued)

*Primary Examiner* — Jeanette E Chapman
(74) *Attorney, Agent, or Firm* — Crowell & Moring LLP

(57) ABSTRACT

A trim assembly is disclosed. The trim assembly includes a trim, where the trim has a curved form, and a trim mounting bracket, where the trim is mountable on the trim mounting bracket.

19 Claims, 13 Drawing Sheets

(56) References Cited

U.S. PATENT DOCUMENTS

| | | |
|---|---|---|
| 8,128,044 B2 | 3/2012 | Liebendorfer |
| 8,375,654 B1 | 2/2013 | West et al. |
| 8,695,290 B1 | 4/2014 | Kim |
| 8,763,968 B2 | 7/2014 | Liebendorfer |
| 8,813,441 B2 | 8/2014 | Rizzo |
| 8,938,932 B1* | 1/2015 | Wentworth .............. H02S 20/23 52/173.3 |
| 2002/0078991 A1 | 6/2002 | Nagao et al. |
| 2003/0070368 A1 | 4/2003 | Shingleton |
| 2004/0163338 A1 | 8/2004 | Liebendorfer |
| 2008/0000173 A1 | 1/2008 | Lenox et al. |
| 2011/0000526 A1 | 1/2011 | West |
| 2011/0138585 A1 | 6/2011 | Kmita |
| 2011/0174947 A1 | 7/2011 | Wu |
| 2012/0080075 A1 | 4/2012 | Hardikar |
| 2012/0102853 A1 | 5/2012 | Rizzo |
| 2012/0255596 A1 | 10/2012 | Korman et al. |
| 2012/0301661 A1 | 11/2012 | West et al. |
| 2013/0140416 A1 | 6/2013 | West et al. |
| 2013/0255167 A1 | 10/2013 | Concho et al. |
| 2013/0291479 A1 | 11/2013 | Schaefer |
| 2013/0335877 A1 | 12/2013 | Keller |
| 2014/0110543 A1 | 4/2014 | Aliabadi et al. |
| 2014/0158184 A1* | 6/2014 | West ....................... H02S 20/24 136/251 |
| 2014/0168927 A1 | 6/2014 | Morris et al. |
| 2014/0239137 A1 | 8/2014 | Liebendorfer |
| 2015/0204489 A1* | 7/2015 | Baello ................. E04F 19/0463 362/231 |

FOREIGN PATENT DOCUMENTS

| | | |
|---|---|---|
| FR | 2 972 574 A1 | 9/2012 |
| WO | WO 2014/004279 A1 | 1/2014 |

OTHER PUBLICATIONS

Backstrom et al., "Report of Experiments of Minimum Gap and Flashing for Rack Mounted Photovoltaic Modules Phase 4", Project No. 11CA43479, File No. IN15911, UL LLC, Northbrook, IL, (Ten (10) pages), Mar. 29, 2012.

Backstrom et al., "Effect of Rack Mounted Photovoltaic Modules on the Flammability of Roofing Assemblies—Demonstration of Mitigation Concepts", Project No. 08CA39594 and 09CA40917, File No. IN15911 and R26475 Underwriters Laboratories Inc., Northbrook, IL, (Twenty Three (23)pages), Revised on Feb. 10, 2010.

European Search Report issued in European counterpart application No. 15186614.2-1504 dated Feb. 26, 2016 (Eight (8) pages).

Canadian Search Report issued in Canadian counterpart application No. 2,905,977 dated Aug. 7, 2017 (Five (5) pages).

* cited by examiner

TRIM ASSEMBLY

This application is a divisional of U.S. patent application Ser. No. 14/515,990, filed Oct. 16, 2014, the disclosure of which is expressly incorporated by reference herein.

BACKGROUND OF THE INVENTION

The solar industry is growing world-wide and, as a result, more-efficient structures are desirable for mounting photovoltaic modules to a structure, such as a roof of a home or other building. Whereas many different structures are known, there is a desire to reduce the complexity of such structures, and improve the efficiency of such structures.

Therefore, there is a need for an improved apparatus for mounting photovoltaic modules.

DETAILED DESCRIPTION OF THE DRAWINGS

Figure 1A:
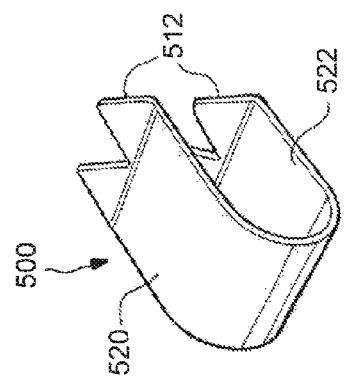
FIG. 1A is a perspective view of a bonding clip in accordance with an embodiment of the present invention.
Figure 1B:
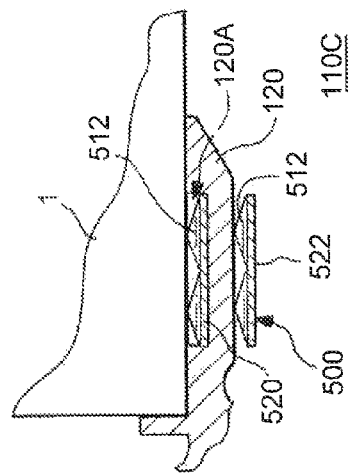
FIG. 1B is a cross-section of the bonding clip of FIG. 1A as positioned with respect to the bracket of the apparatus and a photovoltaic module.
Figure 1:
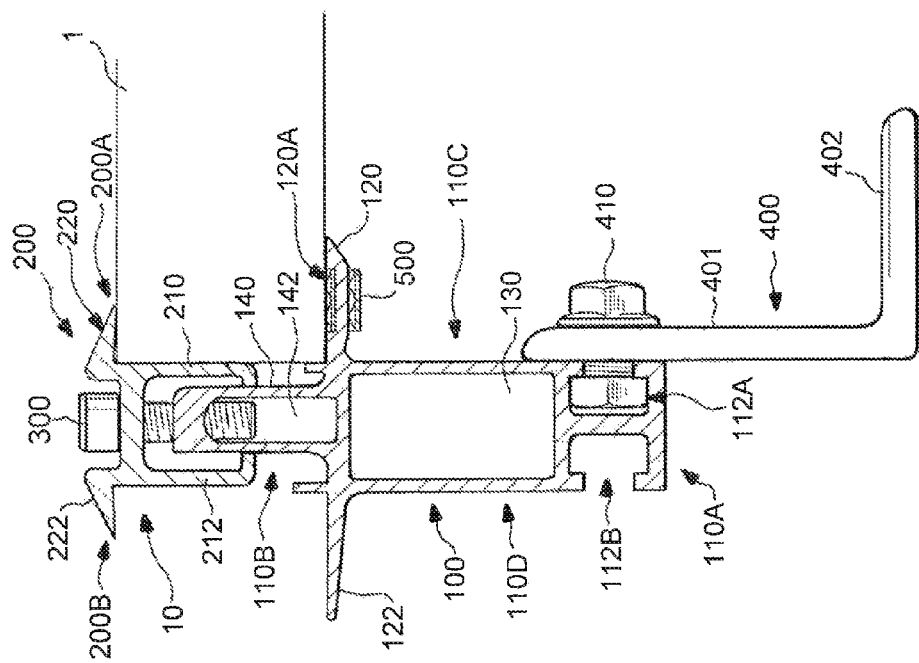
FIG. 1 is a cross-section of an apparatus for mounting photovoltaic modules with a mounted photovoltaic module in accordance with an embodiment of the present invention.

FIG. 1 is a cross-section of an apparatus 10 for mounting photovoltaic modules, with a photovoltaic module 1 mounted thereon, in accordance with an embodiment of the present invention. The apparatus 10 includes a bracket 100, a clamp 200, and a footer 400. An attachment mechanism 300 secures the clamp 200 to the bracket 100.

The bracket 100 defines slots 112A and 112B on opposing sides of the bracket 100 in a lower portion 110A of the bracket 100. Slots 112A and 112B extend along an entire longitudinal length L of the bracket 100, as can be seen at least in FIG. 2.

The bracket 100 includes a first ledge 120 on a first side 110C of the bracket 100 and a second ledge 122 on a second, opposing side 110D of the bracket 100. The opposing sides extend along the longitudinal length of the bracket 100 and between the lower portion 110A and an upper portion 110B of the bracket 100. The bracket 100 defines a cavity 130 between the upper portion 110B of the bracket 100 and the lower portion 110A of the bracket 100 and includes an extension member 140 on the upper portion 110B of the bracket 100. The extension member 140 defines a cavity 142 within the extension member 140.

Figure 2:
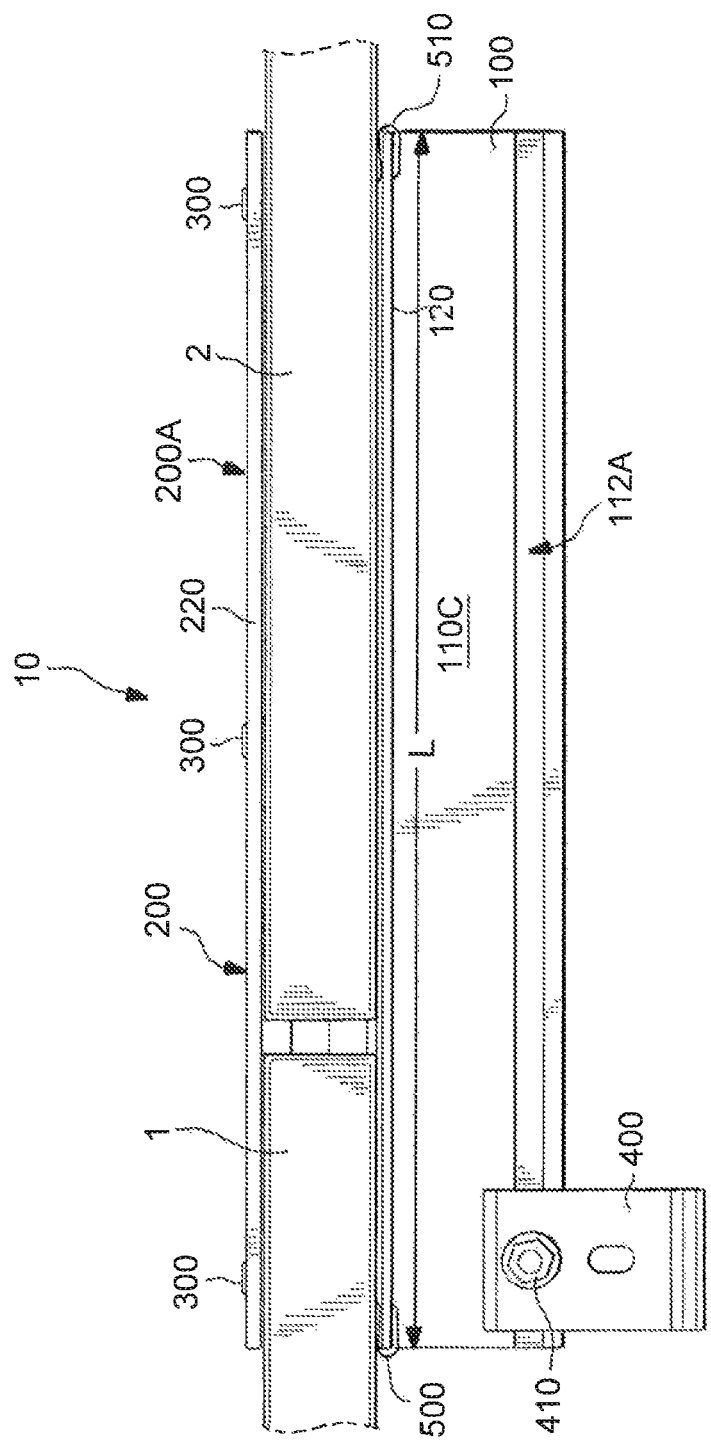
FIG. 2 is a side view of the apparatus for mounting photovoltaic modules of FIG. 1 with two adjacent photovoltaic modules mounted in the apparatus.

As mentioned above, the apparatus 10 also includes a clamp 200 that is securable onto the bracket 100 and on the upper portion 110B of the bracket 100. The clamp 200 includes two opposing legs 210, 212 where the extension member 140 of the bracket 100 is disposed between the two opposing legs 210, 212 of the clamp 200 when the clamp 200 is secured to the bracket 100. A plurality of attachment mechanisms 300, as can be seen in FIG. 2, secure the clamp 200 to the bracket 100 on the upper portion 110B of the bracket 100. The attachment mechanisms may be bolts or screws.

The clamp 200 also includes a first wing 220 on a first side 200A of the clamp 200 and a second wing 222 on a second side 200B of the clamp 200. As will be further discussed below, the wings 220, 222 cooperate with the ledges 120, 122 of the bracket 100, respectively, to secure multiple photovoltaic modules in the apparatus 10. Clamp 200 also extends along the entire longitudinal length L of the bracket 100, as can be seen in FIG. 2, and thus, along the entire longitudinal length of the apparatus 10.

The apparatus 10 also includes a footer 400, as mentioned above. The footer 400 is variably positionable on the bracket 100 along either slot 112A or 112B, as can be further seen in FIGS. 2-8. The footer 400 is generally L-shaped with a first, upright leg 401 and a second, flat leg 402. The upright leg 401 is "upright" in the sense that it extends perpendicularly to the surface on which the footer 400 is mounted. The flat leg 402 is "flat" in the sense that it extends parallel to the surface on which the footer 400 is mounted. The upright leg contains at least one aperture, through which a securement mechanism 410, which may be a bolt and a nut, extends. As shown in FIG. 2, two, or more, apertures may be provided, such that the position of the bracket 100 with respect to the upright leg 401 of the footer 400 may be adjusted by use of the securement mechanism in the different apertures. The shaft of the bolt extends through an aperture of the upright leg 401 and the nut, or other structure, of the securement mechanism 410 is disposed within the slot 112A of bracket 100, or slot 112B if the footer 400 is placed on the opposing side of the bracket 100. As the bolt is threaded down on the nut, the footer 400 is secured at a position on the bracket 100 along the slot 112A. The flat leg 402 of the footer also contains an aperture, and an additional securement mechanism, which may be a lag bolt, extends through the aperture and into a roof structure, e.g., a rafter, to secure the flat leg 402, and thus the footer 400, to the roof structure.

Thus, as discussed above, the footer 400 is variably positionable on the bracket 100 along the slot 112A via the securement mechanism 410 that is disposed through the footer 400 and is received in the slot 112A. By loosening the nut on the bolt, while the nut remains in slot 112A, the footer and securement mechanism may be moved and positioned anywhere along the longitudinal length of the bracket, and then tightened to secure the footer 400 on the bracket 100 at a desired positioned. This provides a benefit since, as will be further discussed later in this specification, the footer is not constrained to a single position on the bracket, but rather, it can be variably positioned on the bracket such that it can be co-located at the position of a roof structure, e.g., a rafter, to which the footer is to be mounted.

Further included in apparatus 10 are first bonding clip 500 and second bonding clip 510. First bonding clip 500, and first and second bonding clips 500, 510, can be seen in FIG. 1A and at least in FIG. 2. The first bonding clip 500 and the second bonding clip 510 are both disposed only on the first side 110C of the bracket 100 and are disposed on opposing longitudinal ends of the first ledge 120 of the bracket 100. Bonding clips 500, 510 include similar structure, and as can best be seen in FIGS. 1A and 1B, the first bonding clip 500, and thus second bonding clip 510, includes teeth 512 on an upper side 520 and a lower side 522 of the bonding clips. As can be particularly seen in FIG. 1A, the first bonding clip 500 and the second bonding clip 510 are each formed generally in a U-shape.

As can be seen at least in FIG. 1 and FIG. 1B, the first ledge 120 of the bracket 100 includes a depression 120A on its upper side and a portion of the first bonding clip 500 is disposed in the depression 120A. Similarly, a portion of the second bonding clip 510 is also disposed in the depression 120A at an opposite longitudinal end of the depression 120A. As will be further discussed below, bonding clips 500, 510 electrically bond the photovoltaic modules to the apparatus 10.

Figure 3:
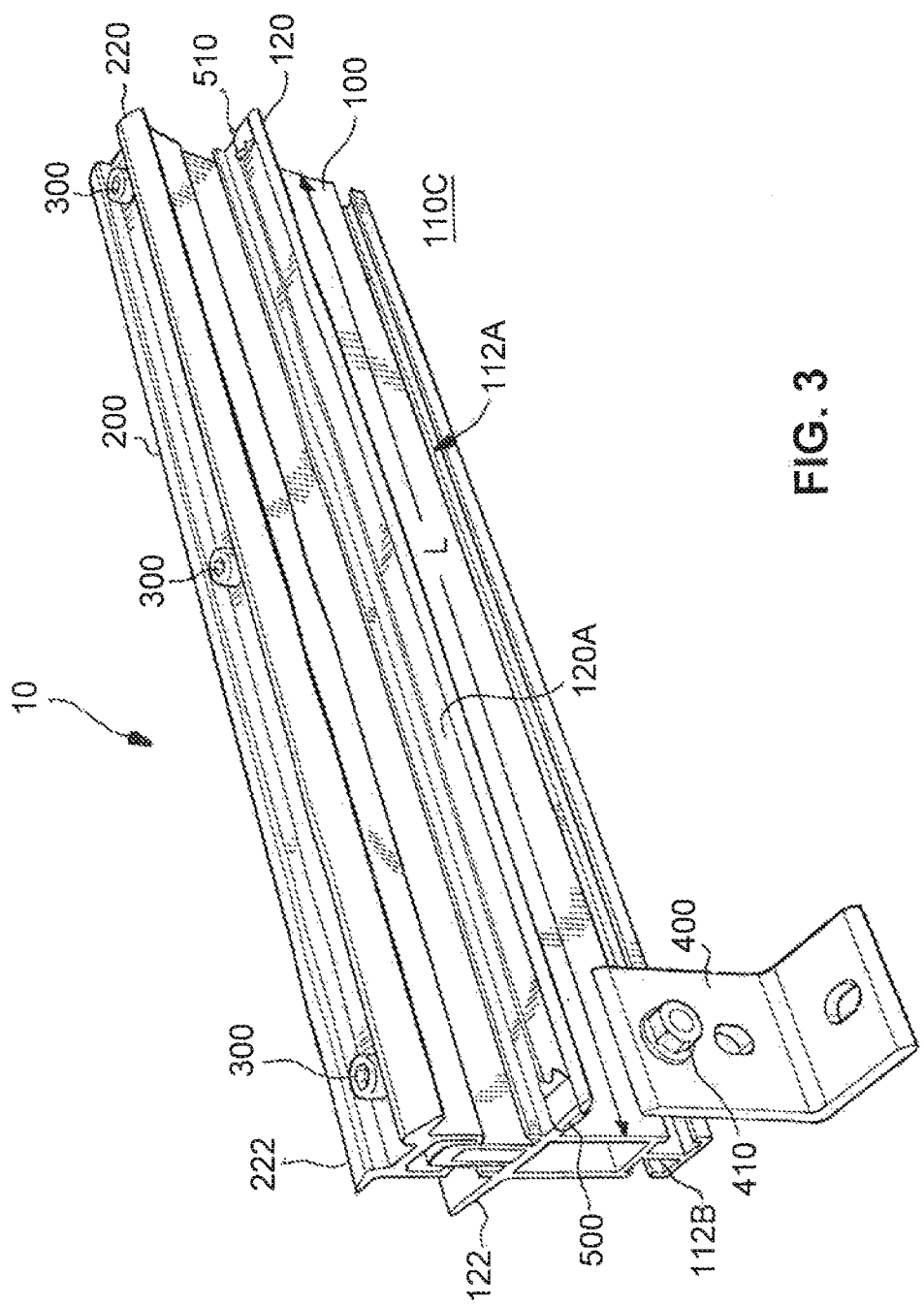
FIG. 3 is a perspective view of the apparatus for mounting photovoltaic modules of FIG. 1 in a first position of the footer with respect to the bracket.

As can be seen at least in FIG. 3, the first ledge 120 of the bracket 100, the second ledge 122 of the bracket 100, the first wing 220 of the clamp 200, and the second wing 222 of the clamp 200 each extend along the entire longitudinal length of the apparatus 10. With this structure of the apparatus 10, as can be seen when considering at least FIG. 1, FIG. 2, and FIG. 10, a first photovoltaic module 1 and a second photovoltaic module 2 are mountable on the first side 110C of the bracket 100 and the first side 200A of the clamp 200 between the first ledge 120 of the bracket 100 and the first wing 220 of the clamp 200 where the first photovoltaic module 1 is adjacent to the second photovoltaic module 2.

The securement mechanisms 300 are threaded into respective apertures in clamp 200 and extension member 140 of bracket 100 to lower the clamp 200 with respect to bracket 100, and thus, clamp the photovoltaic modules 1, 2 between the first ledge 120 of bracket 100 and first wing 220 of clamp 200. Securement mechanisms 300 also electrically bond the clamp 200 to the bracket 100.

As can be understood when considering FIG. 2, when the first photovoltaic module 1 and the second photovoltaic module 2 are clamped between the first ledge 120 and first wing 220, the teeth 512 on the upper side 520 of bonding clip 500 engage with the first photovoltaic module 1 and the teeth 512 on the lower side 522 of bonding clip 500 engage with ledge 120. Similarly, the teeth 512 on the upper side 520 of bonding clip 510 engage with the second photovoltaic module 2 and the teeth 512 on the lower side 522 of bonding clip 510 also engages with ledge 120. As such, the photovoltaic modules 1, 2 are electrically bonded to the apparatus 10 through bonding clips 500, 510.

Figure 10:
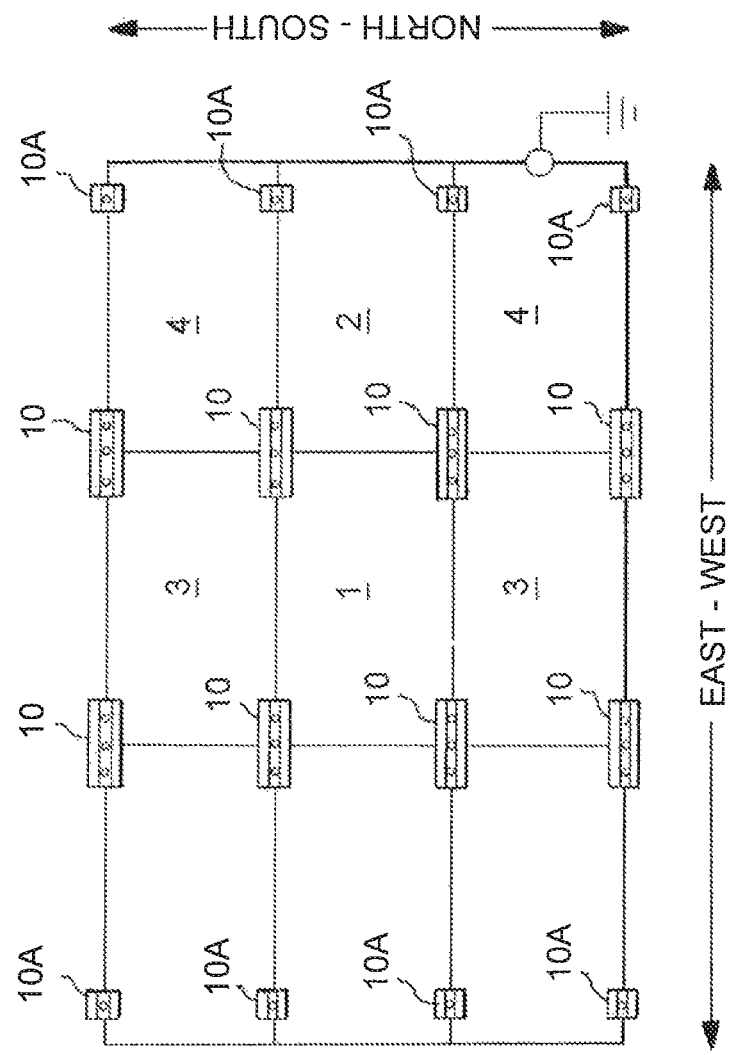
FIG. 10 is a top view of the apparatuses of FIGS. 1 and 9 as used to mount photovoltaic modules.

As can also be understood particularly when considering FIG. 10, on the opposing, second side 110D of the bracket 100 and the opposing, second side 200B of the clamp 200, a third photovoltaic module 3 and a fourth photovoltaic module 4 are mountable on the second side 110D of the bracket 100 and the second side 200B of the clamp 200 between the second ledge 122 of the bracket 100 and the second wing 222 of the clamp 200, where the third photovoltaic module 3 is adjacent to the fourth photovoltaic module 4.

As such, the apparatus can be disposed between 4 photovoltaic modules of an array of photovoltaic modules to mount the 4 photovoltaic modules to a roof structure. Thus, respective corners of the 4 photovoltaic modules are secured in the apparatus 10. If the apparatus 10 is used on the edge of the array, only 2 photovoltaic modules are mounted in the apparatus on one side of the apparatus.

FIG. 3 is a perspective view of the apparatus 10 for mounting photovoltaic modules of FIG. 1 in a first position of the footer 400 with respect to the bracket 100. As discussed above, the footer 400 is variably positionable on the bracket 100 along the slot 112A. As shown in FIG. 3, the footer 400 is positioned at the far left side of the bracket 100 along slot 112A in this Figure.

Figure 4:
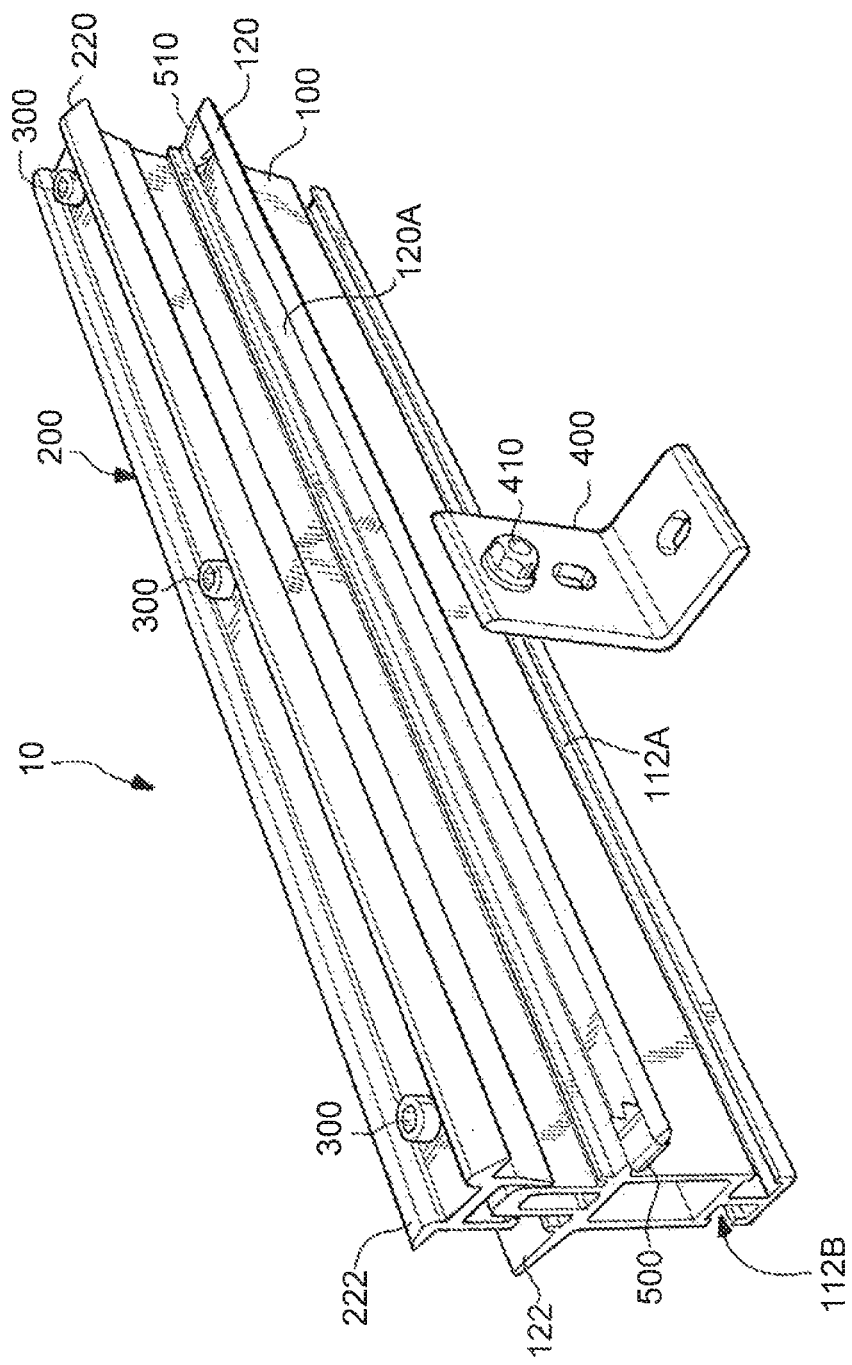
FIG. 4 is a perspective view of the apparatus for mounting photovoltaic modules of FIG. 1 in a second position of the footer with respect to the bracket.
Figure 5:
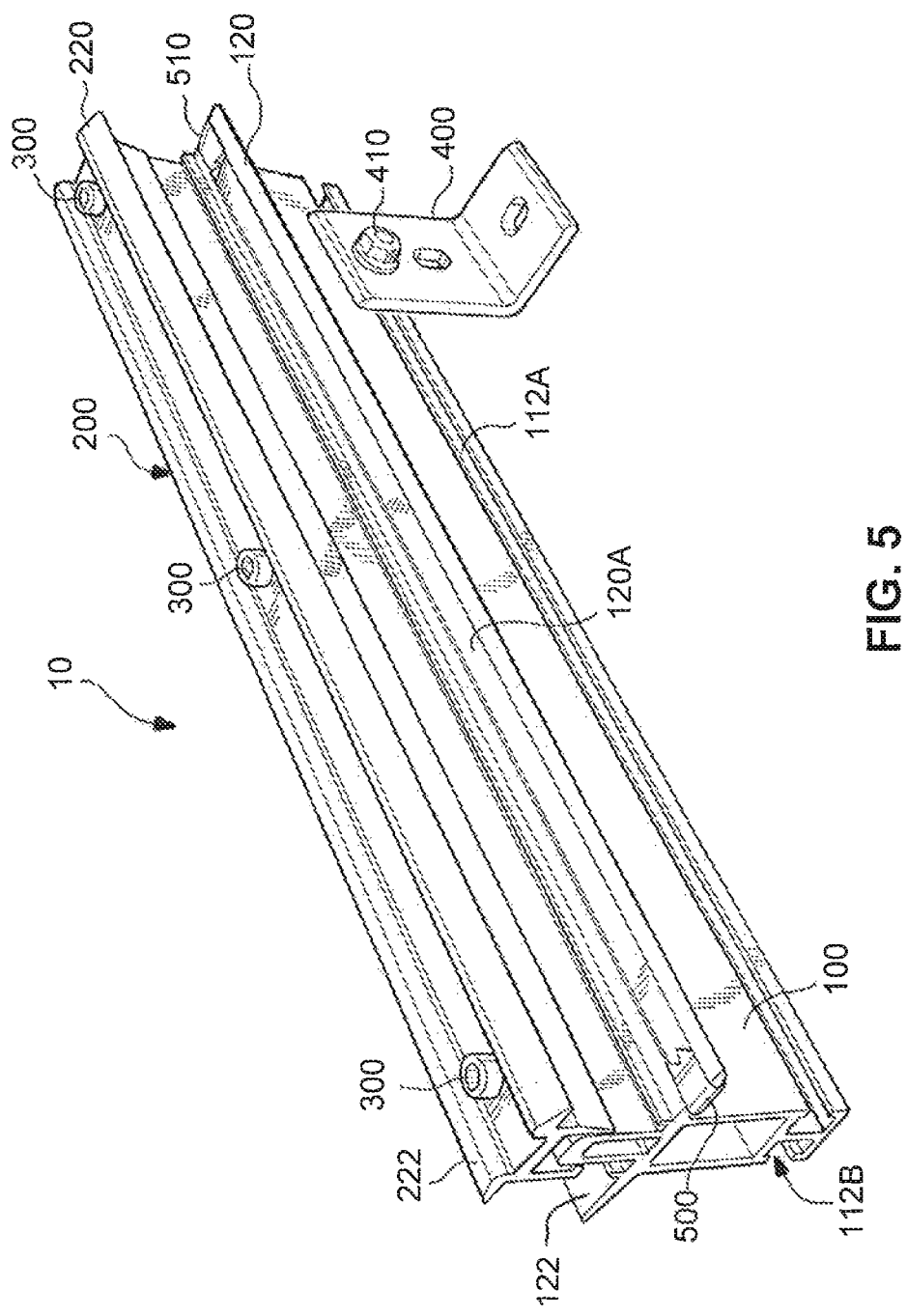
FIG. 5 is a perspective view of the apparatus for mounting photovoltaic modules of FIG. 1 in a third position of the footer with respect to the bracket.

FIGS. 4 and 5 show the footer 400 positioned at other locations on the bracket 100 along the slot 112A. In FIG. 4, the footer 400 is positioned in the middle of the bracket 100 along slot 112A and in FIG. 5 the footer 400 is positioned at the far right side of the bracket 100 along slot 112A. It is only required that one footer be used in the apparatus 10.

Figure 6:
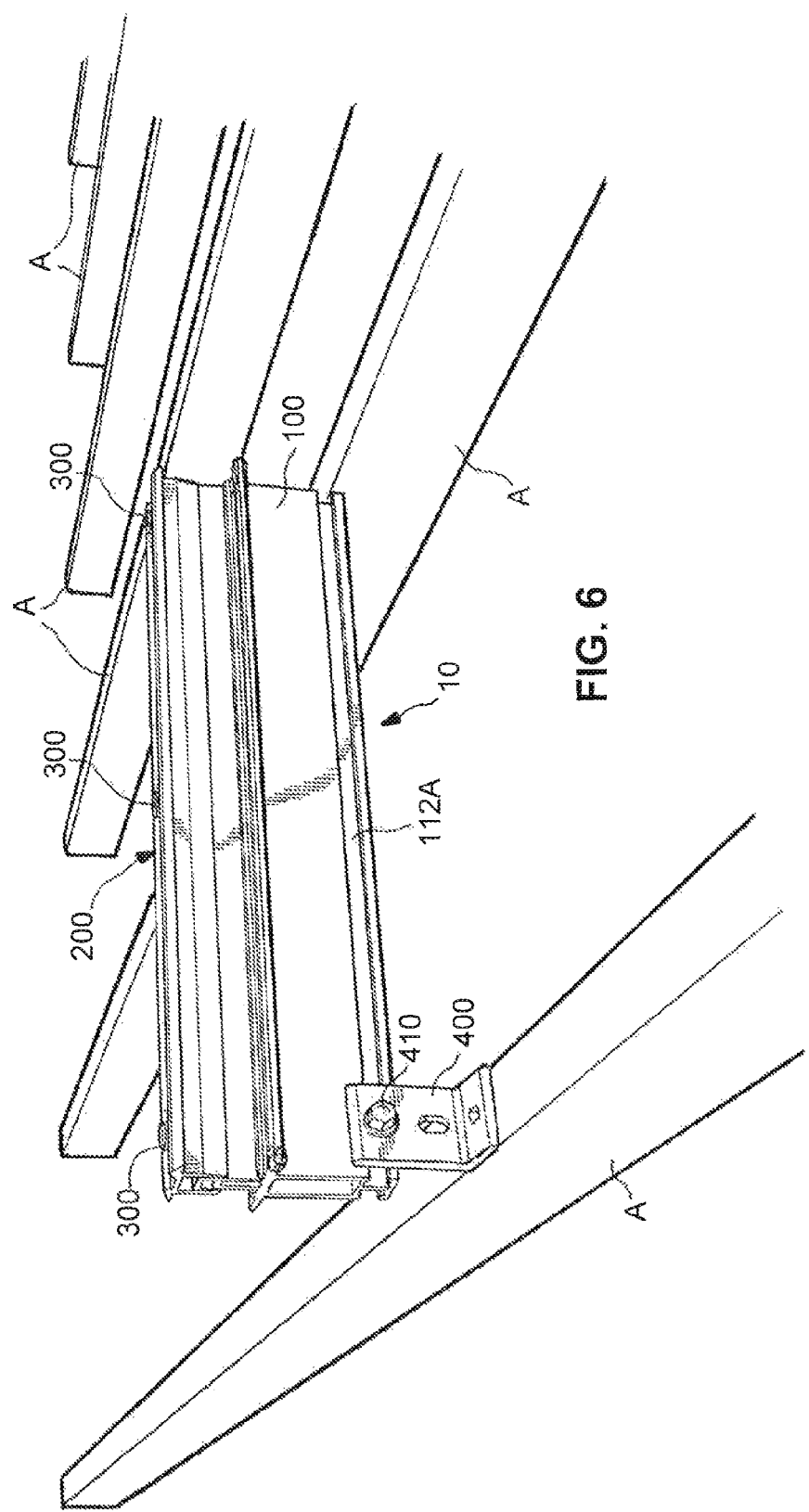
FIG. 6 is a perspective view of the apparatus for mounting photovoltaic modules of FIG. 3 in the first position of the footer with respect to the bracket and the footer attached to a roof support.
Figure 7:
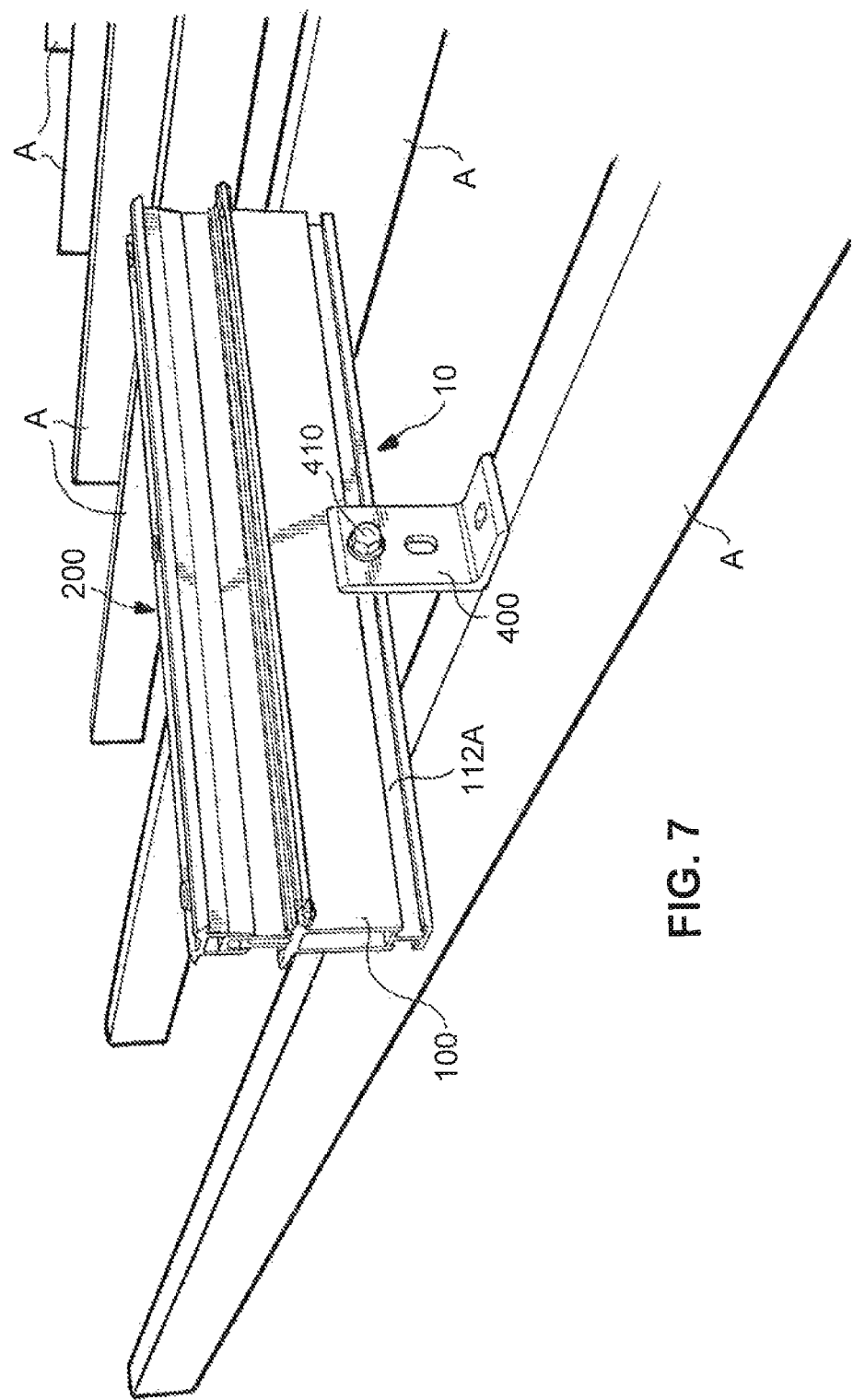
FIG. 7 is a perspective view of the apparatus for mounting photovoltaic modules of FIG. 4 in the second position of the footer with respect to the bracket and the footer attached to a roof support.
Figure 8:
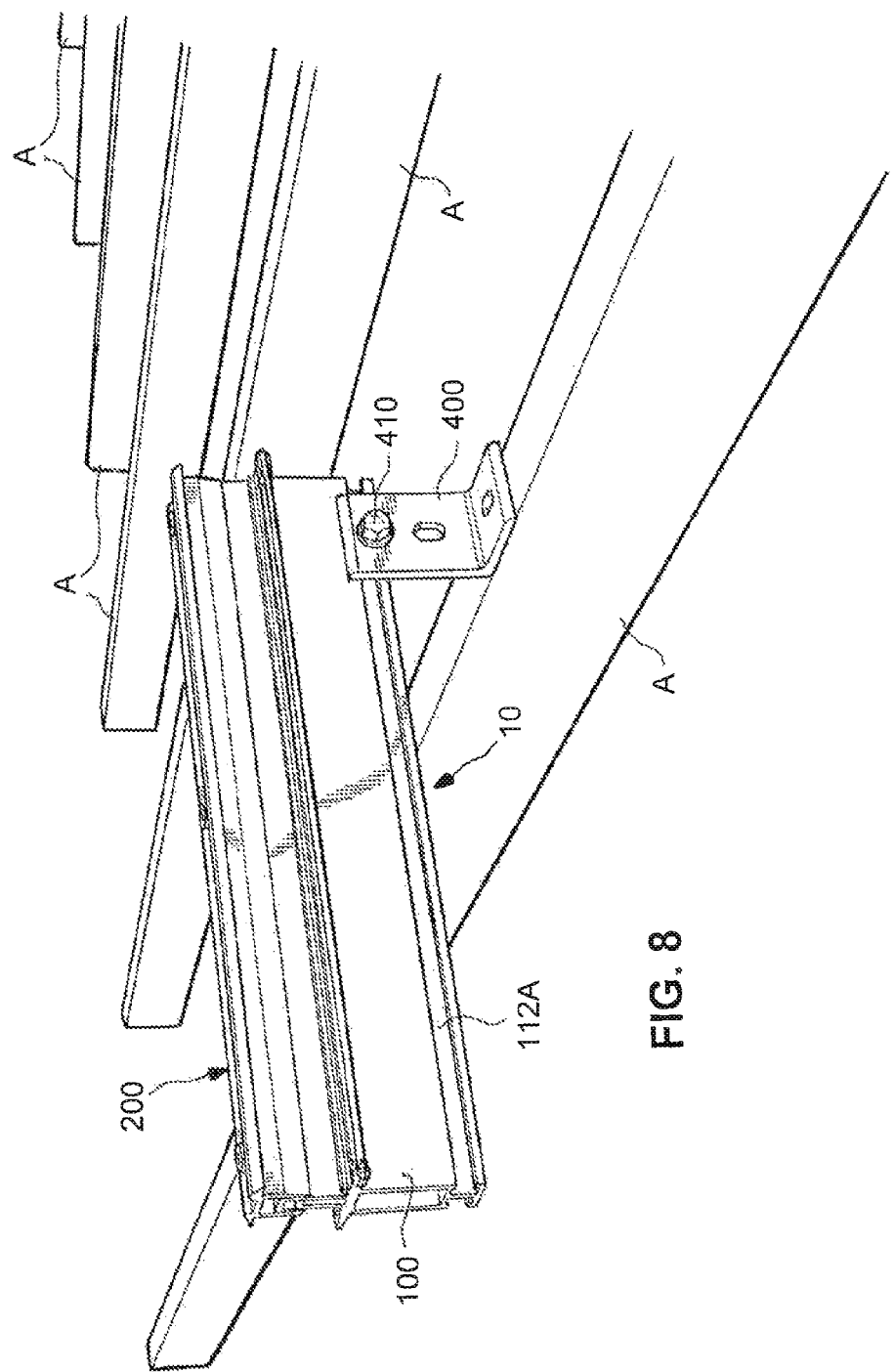
FIG. 8 is a perspective view of the apparatus for mounting photovoltaic modules of FIG. 5 in the third position of the footer with respect to the bracket and the footer attached to a roof support.

FIGS. 6-8 correlate to FIGS. 3-5, respectively, regarding the positioning of the footer 400 with respect to the bracket 100. As can be understood, when the apparatus is used on a roof to mount photovoltaic modules on the roof, the bracket 100 may not always align with a rafter A of the roof at the same position on the bracket 100. Thus, with the present invention, the footer 400 is variably positionable on the bracket 100 such that the position of the footer 400 can be co-located with the position of the rafter A.

Figure 9:
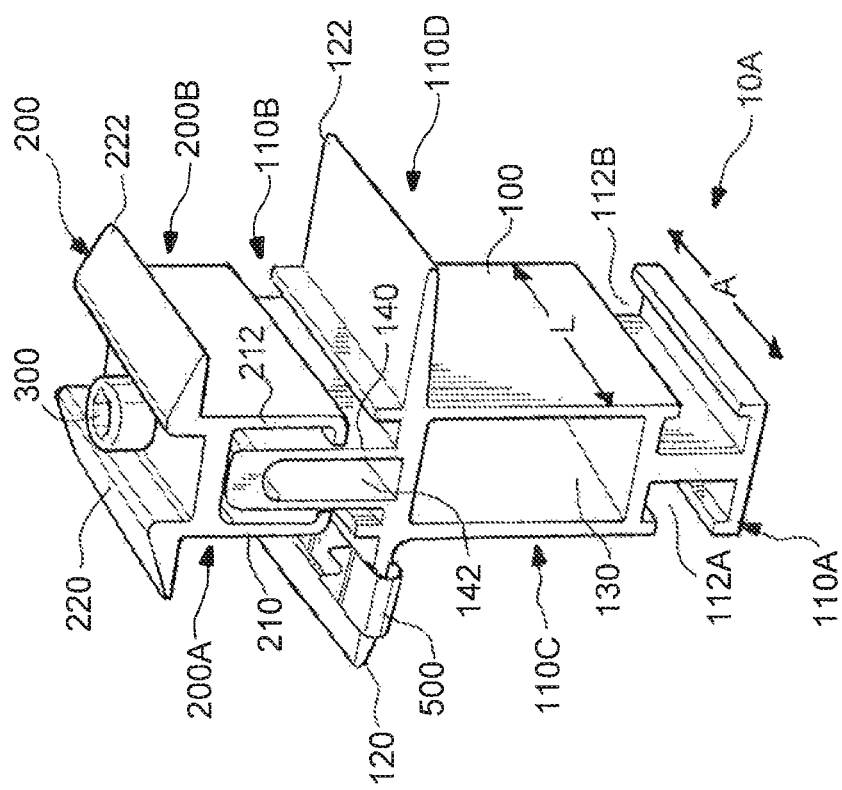
FIG. 9 is a perspective view of a second embodiment of an apparatus for mounting photovoltaic modules in accordance with the principles of the present invention.

FIG. 9 illustrates an alternative embodiment of an apparatus 10A for mounting photovoltaic modules in accordance with the principles of the present invention. The same reference characters are used for the same elements for the embodiments of FIGS. 1 and 9.

As can be seen, the apparatus 10A of FIG. 9 includes the same elements as the apparatus 10 of FIG. 1. A difference between the embodiments is the longitudinal length A of the apparatus of the two embodiments. In the embodiment of FIG. 9, the longitudinal length A of apparatus 10A is much shorter than the longitudinal length of apparatus 10. This is because, as can be seen in FIG. 10, and as discussed above, apparatus 10 can be used to mount four photovoltaic modules in both the East-West (E-W) direction and the North-South (N-S) direction. Apparatus 10A is only used to mount at-most two photovoltaic modules in the N-S direction at the E-W ends of the photovoltaic array. Thus, the apparatus 10 is longer than apparatus 10A to provide greater support for the mounted photovoltaic modules. Another difference is that apparatus 10A may only include a single bonding clip 500.

As discussed above, the apparatus 10A includes the same elements as apparatus 10. Thus, apparatus 10A includes a bracket 100, a clamp 200, and a footer 400 (not shown in FIG. 9). An attachment mechanism 300 secures the clamp 200 to the bracket 100.

The bracket 100 defines slots 112A and 112B on opposing sides of the bracket 100 in a lower portion 110A of the bracket 100. Slots 112A and 112B extend along an entire longitudinal length L of the bracket 100.

The bracket 100 includes a first ledge 120 on a first side 110C of the bracket 100 and a second ledge 122 on a second, opposing side 110D of the bracket 100. The bracket 100 defines a cavity 130 between the upper portion 110B of the bracket 100 and the lower portion 110A of the bracket 100 and includes an extension member 140 on the upper portion 110B of the bracket 100. The extension member 140 defines a cavity 142 within the extension member 140.

The clamp 200 includes two opposing legs 210, 212 where the extension member 140 of the bracket 100 is disposed between the two opposing legs 210, 212 of the clamp 200 when the clamp 200 is secured to the bracket 100. An attachment mechanism 300 secures the clamp 200 to the bracket 100 on the upper portion 110B of the bracket 100.

The clamp 200 also includes a first wing 220 on a first side 200A of the clamp 200 and a second wing 222 on a second side 200B of the clamp 200.

As can be further seen in FIG. 10, a plurality of apparatuses 10 and 10A can be used to mount an array of photovoltaic modules.

As can be seen in FIGS. 11-14, the apparatus 10, and 10A, may further include a trim assembly 600. The trim assembly 600 includes trim 610 and a trim mounting bracket 620. The trim mounting bracket 620 is mountable on the bracket 100 and the trim 610 is mountable on the trim mounting bracket 620.

Figure 11:
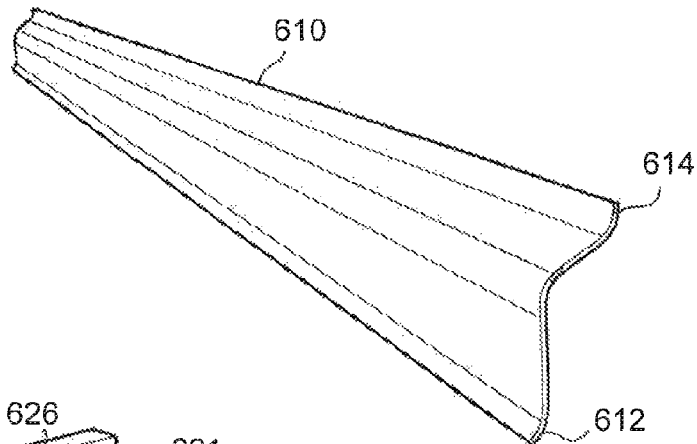
FIG. 11 is a perspective view of a trim in accordance with the principles of the present invention.

As shown in FIG. 11, the trim 610 is an elongated structure with a curved form.

Figure 12:
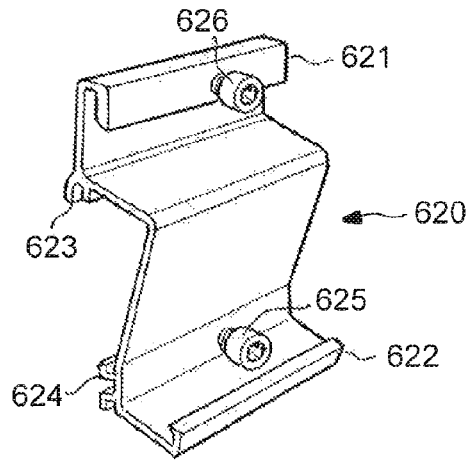
FIG. 12 is a perspective view of a trim mounting bracket in accordance with the principles of the present invention.
Figure 13:
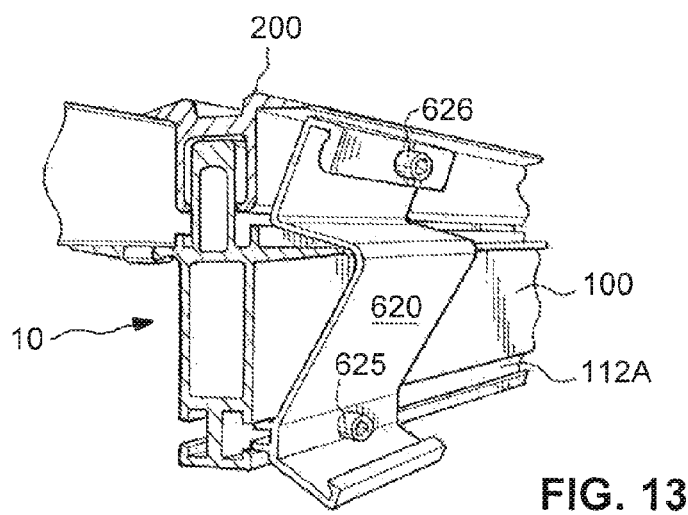
FIG. 13 is a perspective view of the trim mounting bracket of FIG. 12 as secured to the bracket of the mounting apparatus.
Figure 14:
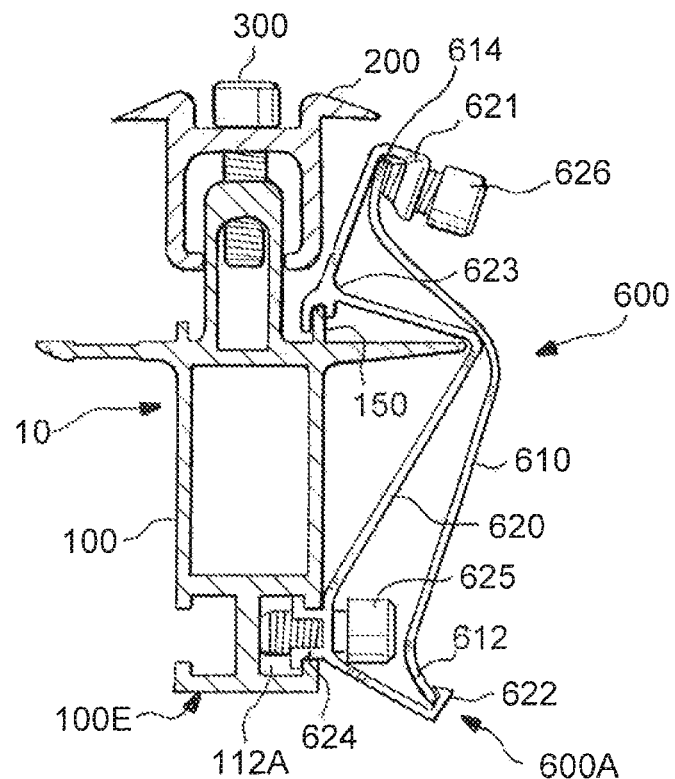
FIG. 14 is a side view of the trim mounting bracket and trim as secured to the bracket of the mounting apparatus.

As shown in FIG. 12, the trim mounting bracket 620 includes two trim mounting structures 621, 622. Both of these mounting structures 621, 622 are generally U-shaped. Trim mounting bracket 620 also includes two bracket mounting structures 623, 624. Mounting structure 623 is generally U-shaped and mounting structure 624 includes two legs that both have an outwardly extending tab on the ends of the legs. As can be seen in FIGS. 13 and 14, trim mounting bracket 620 is mounted on bracket 100 by engaging bracket mounting structure 623 on a ridge 150 of the bracket 100 and by engaging bracket mounting structure 624 in the slot 112A of the bracket 100. The outwardly extending tabs on the ends of the legs of mounting structure 624 engage behind structure of the bracket that defines slot 112A. As such, the trim mounting bracket 620 may be easily positioned at different positions on the bracket 100, i.e., adjusted East-West on the apparatuses, in slot 112A.

An attachment device 625, which may be a screw with a pointed end, is disposed through an aperture in trim mounting bracket 620 and within slot 112A to engage with bracket 100 internal to the slot 112A. The screw cuts into the bracket 100 to electrically bond the trim mounting bracket 620 to the bracket 100.

The trim 610 is mounted in the trim mounting bracket 620 by placing a lower portion 612 of the trim 610 in the trim mounting structure 622 and by placing an upper portion 614 of the trim 610 in the trim mounting structure 621. Thus, the trim 610 can be snapped into the trim mounting bracket 620 and no attachment holes are required in the trim 610, thus aesthetically enhancing the trim.

An attachment device 626, which may also be a screw with a pointed end, is disposed through an aperture in trim mounting bracket 620 and in engagement with the upper portion 614 of trim 610 that is disposed within trim mounting structure 621. The screw cuts into the trim 610 to electrically bond the trim 610 to the trim mounting bracket 620, and thus the bracket 100.

A lowest-most portion 600A of the trim assembly 600 extends below a lowest-most portion 100E of the bracket 100. As such, the trim assembly provides for a fire protection mechanism since the flow of air under the mounting apparatus 10, 10A, and thus under the photovoltaic modules that are mounted on the mounting apparatus 10, 10A, is restricted by the trim assembly 600 which extends below the bracket 100.

A longitudinal length of the trim 610 is much longer than the longitudinal length A of the apparatus 10. As such, a single trim 610 can extend across numerous apparatuses 10, 10A, and thus, be mounted across numerous adjacently mounted apparatuses. Further, the trim is East-West adjustable in the trim mounting bracket 620 depending upon the area it is to cover and can be cut to size depending upon the area to be covered. Also, due to the curved form of the trim 610, adjacent trims 610 may overlap each other in a nestable/telescoping manner when installed, or during storage and shipping of the trims. The nestable/telescoping feature allows one size trim to fit a variety of photovoltaic module lengths regardless of portrait or landscape module orientation, without the need for cutting the trim to length; only positioning is required.

Further, the East-West adjustability of the trim mounting bracket 620 on the apparatuses and the E-W adjustability of the trim 610 within the trim mounting bracket 620 are also benefits. Further yet, the trim 610 helps to provide alignment of a plurality of apparatuses 10, 10A that may be installed in a line, e.g., during installation of a first row of photovoltaic modules in an array.

Figure 15:
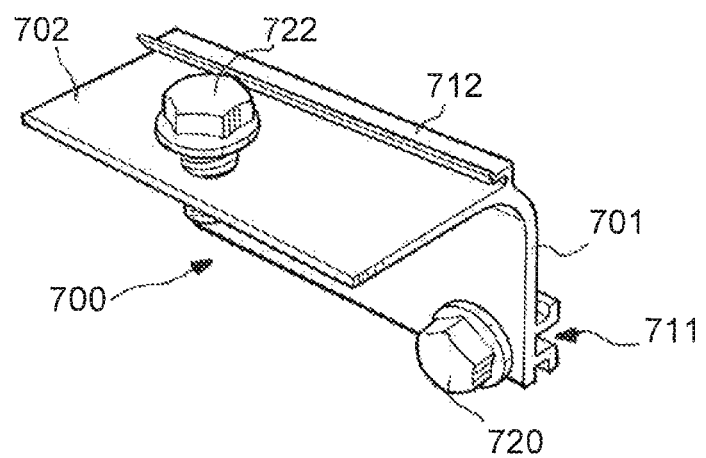
FIG. 15 is a perspective view of a micro-inverter mounting bracket in accordance with the principles of the present invention.
Figure 16:
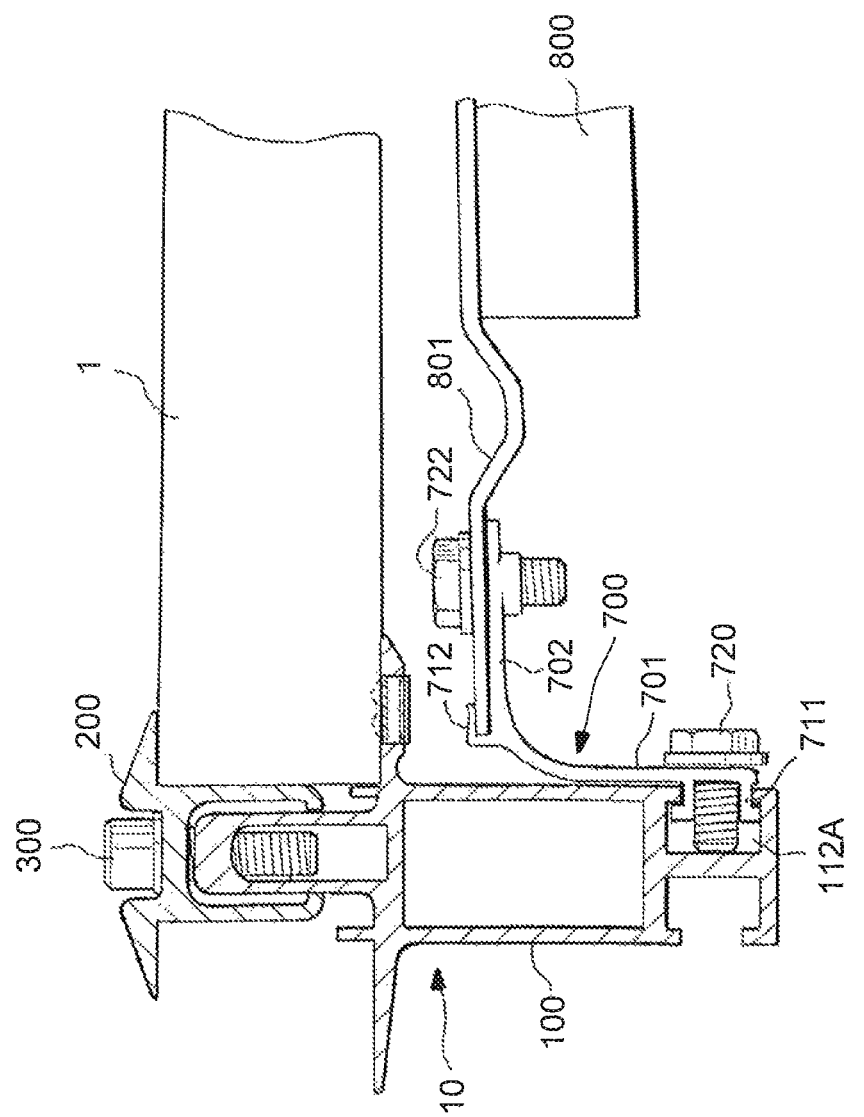
FIG. 16 is a side view of the micro-inverter mounting bracket as secured to the bracket of the mounting apparatus and with a micro-inverter.

Additionally, the apparatus 10 may also include a micro-inverter mounting bracket 700, where the micro-inverter mounting bracket 700 is mountable on the bracket 100. As can be seen in FIGS. 15 and 16, the micro-inverter mounting bracket 700 is generally L-shaped with a first, upright leg 701 and a second, flat leg 702. The upright leg 701 is generally perpendicular to the flat leg 702.

The micro-inverter mounting bracket 700, like trim mounting bracket 620, is also mountable in the slot 112A of the bracket 100. The upright leg 701 of micro-inverter mounting bracket 700 has a micro-inverter mounting bracket mounting structure 711 at its lower end. This structure 711 is similar to structure 624 of trim mounting bracket 620 for mounting in slot 112A. As such, mounting structure 711 also includes two legs that both have an outwardly extending tab on the ends of the legs.

As can be seen in FIG. 16, micro-inverter mounting bracket 700 is mounted on bracket 100 by engaging micro-inverter mounting bracket mounting structure 711 in the slot 112A of the bracket 100. The outwardly extending tabs on the ends of the legs of mounting structure 711 also engage behind the structure of the bracket that defines slot 112A. As such, the micro-inverter mounting bracket 700, like trim mounting bracket 620, may be easily positioned at different positions on the bracket 100, i.e., adjusted East-West on the apparatus.

An attachment device 720, which may be a screw with a pointed end, is disposed through an aperture in leg 701 of micro-inverter mounting bracket 700 and within slot 112A to engage with bracket 100 internal to the slot 112A. The screw cuts into the bracket 100 to electrically bond the micro-inverter mounting bracket 700 to the bracket 100.

Flat leg 702 of micro-inverter mounting bracket 700 includes a flange 712 that receives within it an end of a mounting plate 801 that is associated with a micro-inverter 800. When the end of the mounting plate 801 is received within the flange 712, the plate 801 rests on flat leg 702. An attachment device 722, which may be a screw or a bolt, is disposed through respective apertures in flat leg 702 and plate 801 to mount the micro-inverter 800 on the bracket 100, and thus, apparatus 10. This structure also serves to keep the micro-inverter at a proper height location relative to the roof, the apparatus, and the photovoltaic module that the micro-inverter is associated with. The attachment device 722 also electrically bonds the mounting plate 801 of micro-inverter 800 to the micro-inverter mounting bracket 700.

Also similar to trim mounting bracket 620, micro-inverter mounting bracket 700 is East-West adjustable on bracket 100. Further, the micro-inverter mounting bracket 700 may be installed on either side of mounting bracket 100, i.e., either the North or South side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trim assembly, comprising:
a trim, wherein the trim has a curved form; and
a trim mounting bracket, wherein the trim is mountable on the trim mounting bracket;
and in combination with an apparatus for mounting photovoltaic modules, the apparatus for mounting photovoltaic modules comprising:
a bracket, wherein the bracket defines a slot in a lower portion of the bracket and wherein the slot extends along a longitudinal length of the bracket;
a clamp securable to the bracket on an upper portion of the bracket;
wherein a first photovoltaic module and a second photovoltaic module are mountable on a first side of the bracket and a first side of the clamp, wherein the first photovoltaic module is adjacent to the second photovoltaic module, and wherein only a respective end portion of the first photovoltaic module and the second photovoltaic module is mountable in the first side of the bracket and the first side of the clamp; and
a footer, wherein the footer is variably positionable on the bracket along the slot;
wherein the trim mounting bracket is mountable on the bracket.

2. The trim assembly and apparatus according to claim 1, wherein the trim mounting bracket has a first trim mounting structure and a second trim mounting structure, wherein the first trim mounting structure and the second trim mounting structure are U-shaped, and wherein an upper portion of the trim is receivable in the first trim mounting structure and a lower portion of the trim is receivable in the second trim mounting structure.

3. The trim assembly and apparatus according to claim 2 further comprising an attachment device, wherein the attachment device is disposable through an aperture in the trim mounting bracket and is engageable with the upper portion of the trim when the upper portion of the trim is received in the first trim mounting structure.

4. The trim assembly and apparatus according to claim 3, wherein the attachment device is a screw with a pointed end and wherein the screw cuts into the upper portion of the trim and electrically bonds the trim to the trim mounting bracket when the screw engages with the upper portion of the trim.

5. The trim assembly and apparatus according to claim 2, wherein the trim has no attachment holes for attaching the trim to the trim mounting bracket and wherein the upper portion of the trim is snappable into the first trim mounting structure and the lower portion of the trim is snappable into the second trim mounting structure.

6. The trim assembly and apparatus according to claim 1, wherein the trim mounting bracket has an angled mid-portion, wherein the trim has a curved mid-portion, and wherein the angled mid-portion of the trim mounting bracket is received within the curved mid-portion of the trim when the trim is mounted on the trim mounting bracket.

7. The trim assembly and apparatus according to claim 1, wherein the trim mounting bracket has an upper portion with a first U-shaped trim mounting structure, a lower portion with a second U-shaped trim mounting structure, and a mid-portion with an angled structure.

8. The trim assembly and apparatus according to claim 1, wherein the trim mounting bracket has a first bracket mounting structure and a second bracket mounting structure, wherein the first bracket mounting structure is U-shaped, and wherein the second bracket mounting structure has two legs that each include an outwardly extending tab on a respective end of the two legs.

9. The trim assembly and apparatus according to claim 8, wherein the U-shaped first bracket mounting structure is engageable on a ridge of the bracket and wherein the second bracket mounting structure is engageable in the slot of the bracket.

10. The trim assembly and apparatus according to claim 9, wherein the outwardly extending tabs of the two legs of the second bracket mounting structure are engageable behind structure of the bracket that defines the slot.

11. The trim assembly and apparatus according to claim 1 further comprising an attachment device, wherein the attachment device is disposable through an aperture in the trim mounting bracket and within the slot of the bracket and is engageable with the bracket internal to the slot.

12. The trim assembly and apparatus according to claim 11, wherein the attachment device is a screw with a pointed end and wherein the screw cuts into the bracket and electrically bonds the trim mounting bracket to the bracket when the screw engages with the bracket.

13. The trim assembly and apparatus according to claim 1, wherein a top portion of the trim is electrically bonded to a top portion of the trim mounting bracket and wherein a bottom portion of the trim mounting bracket is electrically bonded to the bracket.

14. The trim assembly and apparatus according to claim 1, wherein a longitudinal length of the trim is longer than the longitudinal length of the bracket.

15. The trim assembly and apparatus according to claim 14, where the trim extends across the first photovoltaic module and the second photovoltaic module when the trim and the first photovoltaic module and the second photovoltaic module are mounted on the bracket.

16. The trim assembly and apparatus according to claim 1, wherein a lowest-most portion of the trim assembly extends below a lowest-most portion of the bracket.

17. The trim assembly and apparatus according to claim 1, further comprising:
 a first bonding clip and a second bonding clip, wherein the first bonding clip and the second bonding clip are disposed on the first side of the bracket;
 wherein the first bonding clip and the second bonding clip are disposed on opposing longitudinal ends of a first ledge of the bracket and wherein the first photovoltaic module and the second photovoltaic module are engageable with the first bonding clip and the second bonding clip, respectively;
 wherein the first ledge includes a depression and wherein a portion of the first bonding clip and a portion of the second bonding clip are disposed in the depression.

18. The trim assembly and apparatus according to claim 1, further comprising a micro-inverter mounting bracket, wherein the micro-inverter mounting bracket is mountable on the bracket.

19. The trim assembly and apparatus according to claim 18, wherein the micro-inverter mounting bracket is mountable in the slot of the bracket.

* * * * *